US008634158B1

(12) United States Patent
Chahwan et al.

(10) Patent No.: US 8,634,158 B1
(45) Date of Patent: Jan. 21, 2014

(54) DISK DRIVE GENERATING FEED-FORWARD ACTUATOR COMPENSATION BASED ON A SPEAKER DRIVER SIGNAL

(75) Inventors: Alain Chahwan, Irvine, CA (US); William Flynn, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 162 days.

(21) Appl. No.: 13/298,170

(22) Filed: Nov. 16, 2011

(51) Int. Cl.
*G11B 21/02* (2006.01)

(52) U.S. Cl.
USPC .......................................................... 360/75

(58) Field of Classification Search
None
See application file for complete search history.

(56) References Cited

U.S. PATENT DOCUMENTS

| | | | |
|---|---|---|---|
| 5,299,075 A | 3/1994 | Hanks | |
| 5,333,138 A | 7/1994 | Richards et al. | |
| 5,654,840 A | 8/1997 | Patton et al. | |
| 5,663,847 A | 9/1997 | Abramovitch | |
| 5,923,487 A | 7/1999 | Carlson et al. | |
| 6,115,200 A | 9/2000 | Allen et al. | |
| 6,414,813 B2 | 7/2002 | Cvancara | |
| 6,429,990 B2 | 8/2002 | Serrano et al. | |
| 6,538,839 B1 | 3/2003 | Ryan | |
| 6,614,618 B1 | 9/2003 | Sheh et al. | |
| 6,636,377 B1 | 10/2003 | Yu et al. | |
| 6,674,600 B1 | 1/2004 | Codilian et al. | |
| 6,710,966 B1 | 3/2004 | Codilian et al. | |
| 6,754,021 B2 | 6/2004 | Kisaka et al. | |
| 6,795,262 B1 | 9/2004 | Codilian et al. | |
| 6,853,512 B2 | 2/2005 | Ozawa | |
| 6,900,958 B1 | 5/2005 | Yi et al. | |
| 6,909,574 B2 | 6/2005 | Aikawa et al. | |
| 6,914,743 B1 | 7/2005 | Narayana et al. | |
| 6,950,271 B2 | 9/2005 | Inaji et al. | |
| 6,952,318 B1 | 10/2005 | Ngo | |
| 6,958,882 B2 | 10/2005 | Kisaka | |
| 6,967,804 B1 | 11/2005 | Codilian | |
| 7,139,401 B2 | 11/2006 | Culman et al. | |
| 7,142,385 B2 | 11/2006 | Shimotono et al. | |
| 7,154,690 B1 | 12/2006 | Brunnett et al. | |
| 7,382,563 B2 | 6/2008 | Saitoh et al. | |
| 7,423,833 B1 | 9/2008 | Sutardja | |
| 7,471,483 B1 | 12/2008 | Ferris et al. | |
| 7,561,365 B2 | 7/2009 | Noguchi et al. | |
| 7,595,953 B1 | 9/2009 | Cerda et al. | |
| 7,596,795 B2 | 9/2009 | Ding et al. | |
| 7,633,704 B2 | 12/2009 | Supino et al. | |
| 7,852,588 B1 | 12/2010 | Ferris et al. | |

(Continued)

FOREIGN PATENT DOCUMENTS

JP    2001-266466    9/2001

OTHER PUBLICATIONS

L. Hakansson, "The Filtered-x LMS Alogrithm", Department of Telecommunications and Signal Processing, University of Karlskrona/Rooneby, 372 25 Ronneby, Sweden, Jan. 15, 2004.

*Primary Examiner* — Paul Huber

(57) ABSTRACT

A disk drive is disclosed comprising a disk, a head, an actuator for actuating the head over the disk, and control circuitry comprising a servo control system for controlling the actuator. A compensation value is generated based on a speaker driver signal, and the actuator is controlled using the compensation value.

20 Claims, 5 Drawing Sheets

(56) References Cited

U.S. PATENT DOCUMENTS

| | | |
|---|---|---|
| 8,179,626 B1 | 5/2012 | Ryan et al. |
| 2002/0153451 A1 | 10/2002 | Kiss et al. |
| 2003/0123182 A1 | 7/2003 | Inaji et al. |
| 2004/0080860 A1 | 4/2004 | Inaji et al. |
| 2004/0240101 A1 | 12/2004 | Inaji et al. |
| 2005/0088774 A1 | 4/2005 | Bahirat et al. |
| 2006/0291087 A1 | 12/2006 | Suh et al. |
| 2006/0291101 A1 | 12/2006 | Takaishi |
| 2008/0174900 A1 | 7/2008 | Abrishamchian et al. |
| 2009/0034116 A1 | 2/2009 | Higashino et al. |
| 2009/0034117 A1 | 2/2009 | Higashino |
| 2009/0135516 A1 | 5/2009 | Takasaki et al. |
| 2010/0061007 A1 | 3/2010 | Matsushita et al. |
| 2010/0079906 A1 | 4/2010 | Wile et al. |
| 2012/0050904 A1 | 3/2012 | Park et al. |
| 2013/0120870 A1 | 5/2013 | Zhou et al. |

DISK DRIVE GENERATING FEED-FORWARD ACTUATOR COMPENSATION BASED ON A SPEAKER DRIVER SIGNAL

BACKGROUND

Disk drives are employed in numerous areas such as computer systems (e.g., desktops, laptops, portables, servers, network attached storage, etc.) and consumer devices (e.g., music players, digital video recorders, televisions, etc.). A disk drive comprises a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track, as well as maintain the head over a target track during write/read operations.

DETAILED DESCRIPTION OF EMBODIMENTS OF THE INVENTION

Figure 1:
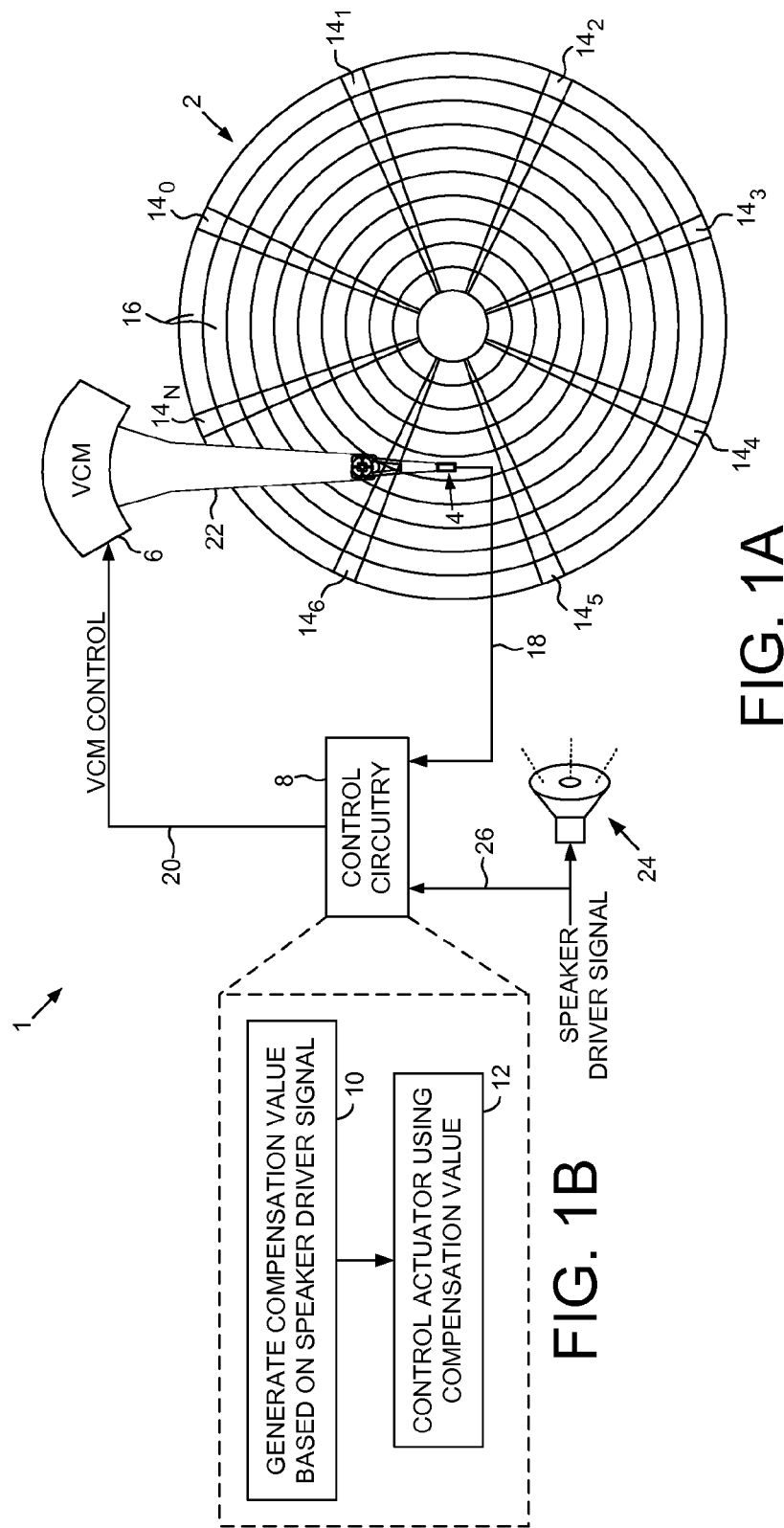
FIG. 1A shows a disk drive according to an embodiment of the present invention comprising a head actuated over a disk by an actuator.
FIG. 1B shows a flow diagram according to an embodiment of the present invention wherein a compensation value is generated based on a speaker driver signal, and the actuator controlled using the compensation value.

FIG. 1A shows a disk drive 1 according to an embodiment of the present invention comprising a disk 2, a head 4, an actuator (e.g., VCM 6) for actuating the head 4 over the disk 2, and control circuitry 8 comprising a servo control system for controlling the actuator. The control circuitry 8 is operable to execute the flow diagram of FIG. 1B wherein a compensation value is generated based on a speaker driver signal (step 10), and the actuator is controlled using the compensation value (step 12).

In the embodiment of FIG. 1A, the disk 2 comprises embedded servo sectors $14_0$-$14_N$ that define a plurality of servo tracks 16. The control circuitry 8 processes a read signal 18 emanating from the head 4 to demodulate the servo sectors $14_0$-$14_N$ and generate a position error signal (PES) representing an error between the actual position of the head and a target position relative to a target track. The control circuitry 8 filters the PES using a suitable compensation filter to generate a control signal 20 applied to the VCM 6 which rotates an actuator arm 22 about a pivot in order to actuate the head 4 radially over the disk in a direction that reduces the PES. The servo sectors $14_0$-$14_N$ may comprise any suitable position information, such as a track address for coarse positioning and servo bursts for fine positioning.

In one embodiment, the head 4 may comprise a suitable fly height actuator, such as a heater or a piezoelectric actuator, operable to actuate the head vertically over the disk in order to maintain a target fly height. The control circuitry 8 may comprise a servo control system operable to compare a measured fly height to a target fly height to generate a fly height error used to generate a fly height control signal similar to the servo control system that controls the radial position of the head.

The disk drive 1 of FIG. 1A is deployed in a system comprising a speaker 24 that is driven by the speaker driver signal 26. The sound generated by the speaker 24 may create undesirable vibrations that manifest as a disturbance in the servo control system(s) used to position the head 4 over the disk 2 (radially and/or vertically). To compensate for this disturbance, the speaker driver signal 26 is evaluated by the control circuitry 8 in order to generate compensation values applied to the servo control system(s). In one embodiment, the compensation values comprise feed-forward compensation values that effectively anticipate and compensate for the affect of the disturbance.

Figure 2:
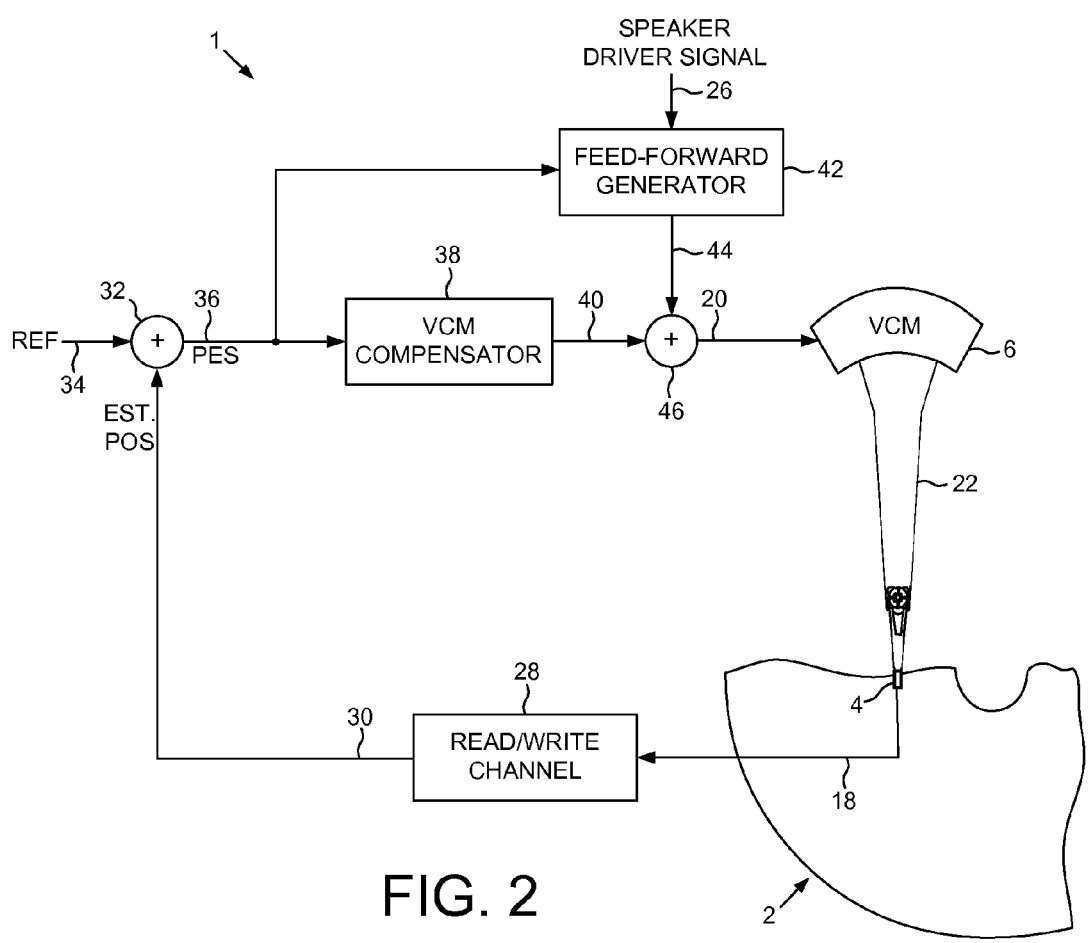
FIG. 2 shows elements of a VCM servo control system, including feed-forward compensation values generated based on the speaker driver signal.

FIG. 2 shows details of a servo control system for controlling the VCM 6 in order to position the head 4 radially over the disk 2. A suitable read/write channel 28 demodulates the read signal 18 into an estimated position 30 for the head 4 relative to the disk 2. The estimated position 30 is subtracted 32 from a reference position 34 to generate a position error signal (PES) 36. A suitable VCM compensator 38 processes the PES 36 to generate a control signal 40. A suitable feed-forward generator 42 processes the PES 36 and the speaker driver signal 26 to generate feed-forward compensation values 44. The feed-forward compensation values 44 adjust 46 the control signal 40 output by the VCM compensator 38 to generate the VCM control signal 20.

Figure 3:
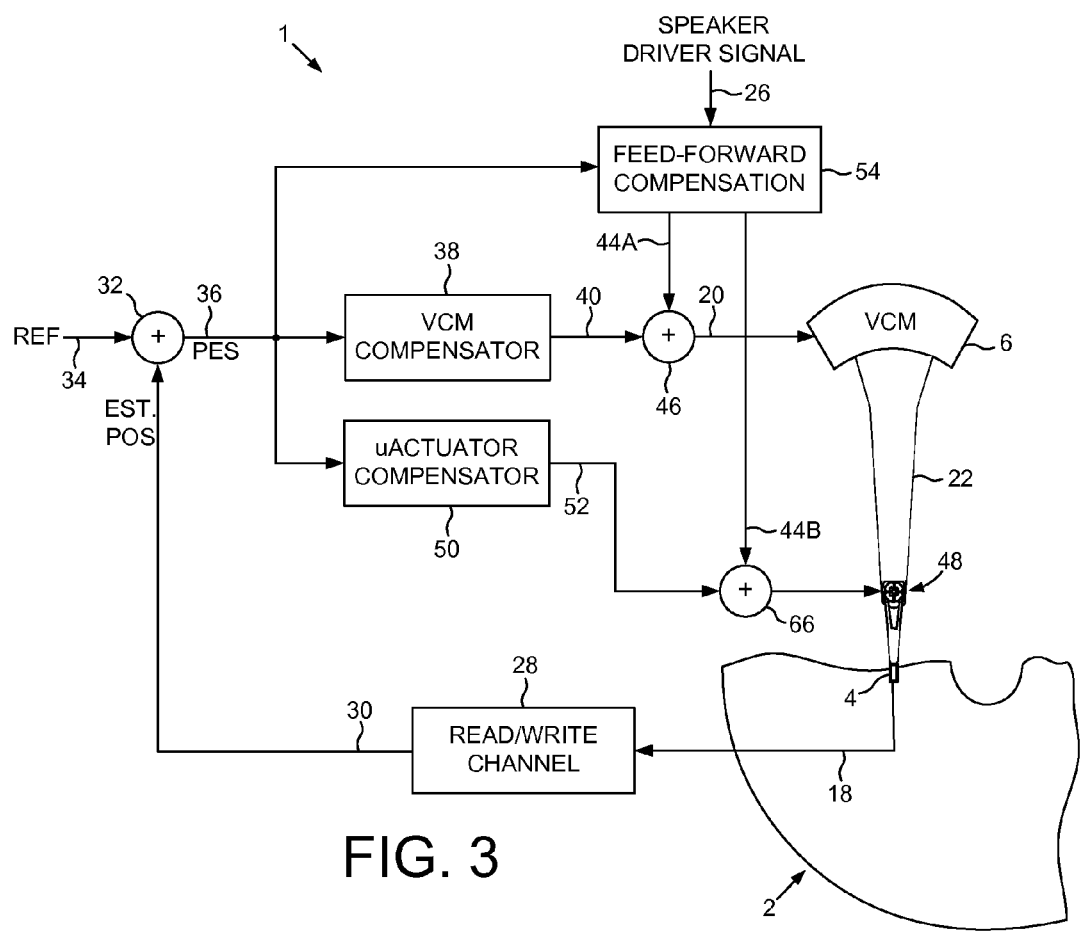
FIG. 3 shows elements of a VCM and microactuator servo control system, including feed-forward compensation values generated based on the speaker driver signal.

FIG. 3 shows an embodiment of the invention wherein the disk drive 1 comprises a suitable microactuator 48, such as a suitable piezoelectric actuator, for actuating the head 4 in fine movements radially over the disk 2. In the embodiment of FIG. 3, the microactuator 48 actuates a suspension relative to the actuator arm 22; however, the microactuator may be implemented in any suitable manner, such as a microactuator that actuates a head gimbal relative to the suspension. A microactuator compensator 50 processes the PES 36 to generate a control signal 52, and a feed-forward generator 54 generates feed-forward compensation values 44A for the VCM 6 and/or feed-forward compensation values 44B for the microactuator 48 in response to the PES 36 and the speaker driver signal 26.

Figure 4A:
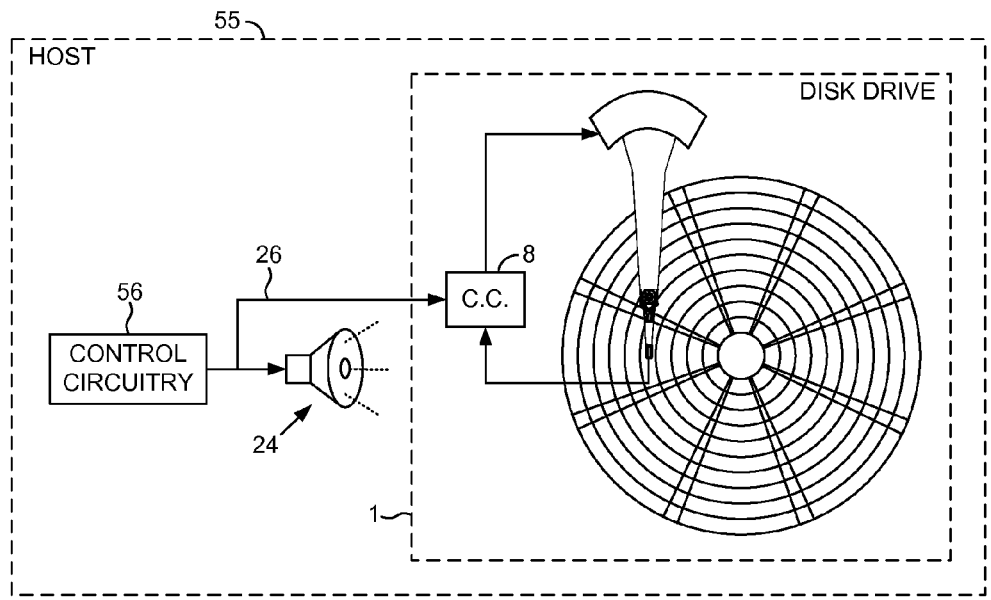
FIG. 4A shows an embodiment of the present invention wherein the disk drive comprises an interface for receiving the speaker driver signal from a host.

FIG. 4A shows an embodiment of the present invention wherein the speaker 24 is part of a host system 55, such as a desktop computer, laptop computer, or a television. Control circuitry 56 within the host system generates the speaker driver signal 26 for driving the speaker 24, wherein the speaker driver signal 26 is also input into the disk drive 1. In one embodiment, the speaker driver signal 26 is input into the disk drive 1 as the analog signal that drives the voice coil of the speaker 24. The control circuitry 8 within the disk drive 1 samples the analog speaker drive signal 26 using a suitable analog-to-digital converter (ADC) to generate a digital signal. The digital signal is then processed to generate the compensation values, such as the feed-forward compensation values. In this embodiment, the disk drive interface may comprise a dedicated wire for transmitting the analog speaker drive signal 26, wherein the dedicated wire is input into the ADC.

Figure 4B:
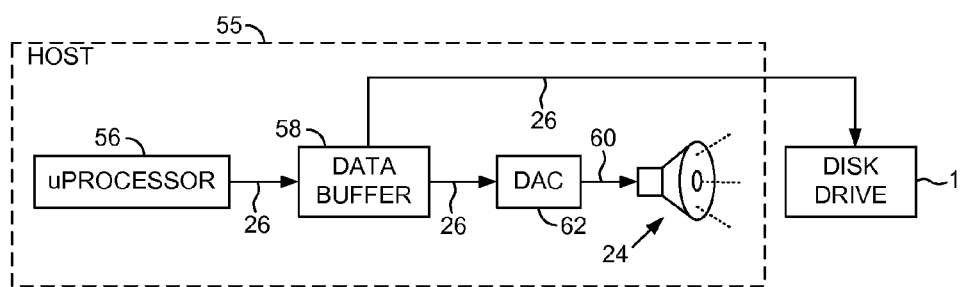
FIG. 4B shows an embodiment of the present invention wherein the speaker driver signal comprises a digital signal that is converted into an analog signal for driving a speaker.

In an alternative embodiment shown in FIG. 4B, the host 55 comprises a suitable microprocessor 56 for generating a sequence of digital values 26 representing the audio signal for the speaker 24. The digital values 26 are buffered in a data buffer 58, and as the digital values 26 are transferred out of the data buffer 58, they are converted into an analog speaker driver signal 60 by a digital to analog converter (DAC) 62. In this embodiment, the digital values representing the audio signal are transferred from the data buffer 58 to the disk drive 1 as a digital speaker driver signal 26. Any suitable technique may be employed to transfer the digital speaker driver signal 26 to the disk drive 1, such as over a conventional interface for transmitting commands and user data to the disk drive 1. Alternatively, the disk drive 1 may comprise a dedicated interface for receiving the digital speaker driver signal 26, wherein the dedicated interface may be wired or wireless (e.g., Bluetooth, Wi-Fi, etc.).

In the embodiments of the present invention, the frequencies of concern in the speaker driver signal 26 are low enough to allow time to generate the compensation values. Whether the speaker driver signal 26 is transmitted to the disk drive 1 as an analog or digital signal, the control circuitry 8 in the disk drive 1 effectively synchronizes the compensation values in time with the expected vibration effect, taking into account any transport delay for the speaker driver signal 26 as well as any delayed response of the vibration. In the embodiment where the speaker driver signal 26 is a digital signal, the digital signal may comprise a suitable sequence of time stamps to facilitate the synchronization process.

Figure 5:
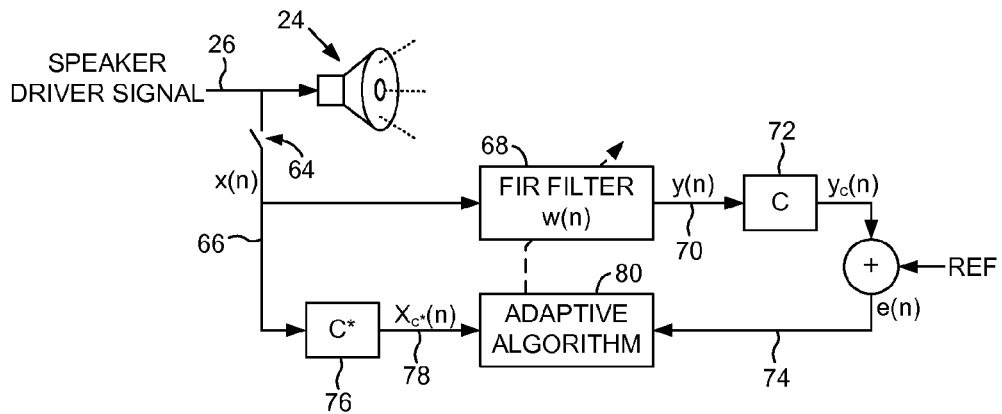
FIG. 5 shows control circuitry for adapting the feed-forward compensation values generated based on the speaker driver signal according to an embodiment of the present invention.

FIG. 5 shows an embodiment of the present invention for adaptively generating feed-forward compensation values for the servo control system(s). The speaker driver signal 26 in this embodiment is sampled to generate a sequence of digital values x(n) 66 that are filtered by a finite impulse response (FIR) filter 68 to generate feed-forward compensation values y(n) 70 applied to the plant C 72 representing, for example, the VCM 6. The output $y_c(n)$ of the plant C 72 is subtracted from a reference to generate an error signal e(n) 74 (e.g., the PES of the VCM servo control system). The digital values x(n) 66 of the speaker driver signal 26 are applied to a model C* 76 of the plant C 72 to generate a sequence of digital values $X_{c*}(n)$ 78 representing the estimated effect the digital values x(n) 66 have on the plant C 72. An adaptive algorithm 80 processes the digital values $X_{c*}(n)$ 78 and the error signal e(n) 74 in order to adapt the FIR filter 68 toward a state that minimizes the error signal e(n) 74. In one embodiment, the goal is to minimize a cost function $J(n)=E[e(n)^2]$, where:

$$y(n) = w^T(n)x(n)$$

$$e(n) = d(n) - y_c(n)$$

$$x_{c*}(n) = \begin{bmatrix} \sum_{i=0}^{l-1} c_i^* x(n-i) \\ \sum_{i=0}^{l-1} c_i^* x(n-i-1) \\ \vdots \\ \sum_{i=0}^{l-1} c_i^* x(n-i-M-1) \end{bmatrix}$$

In the above equations, d(n) represents the reference signal and w represents the vector of coefficients in the FIR filter 68. To find the optimal coefficients of the FIR filter the gradient method is used as described by:

$$\nabla_{w(n)}J(n)=2E[e(n)\nabla_{w(n)}e(n)]$$

which results in $$w(n+1)=\gamma w(n)+\mu x_{c*}(n)e(n)$$

where γ represents the leakage factor and μ represents the step size. The above described adaption algorithm is based on a known filtered-X LMS algorithm. However, the feed-forward compensation values may be generated using any suitable algorithm.

In one embodiment, the algorithm for generating the feed-forward compensation values may be tuned during a calibration procedure while generating a predetermined speaker driver signal 26 (e.g., a sinusoid at a predetermined frequency). In another embodiment, the algorithm for generating the feed-forward compensation values may be continuously adapted during normal operation so as to adapt the system to the current operating environment, including the current spectral components of the speaker driver signal 26.

Figure 6A:
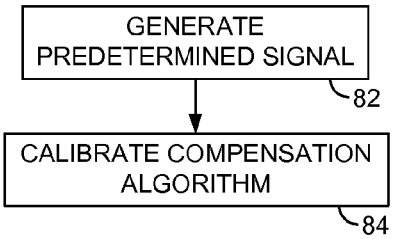
FIG. 6A is a flow diagram according to an embodiment of the present invention wherein the compensation values are adapted during a calibration procedure when the speaker driver signal comprises a predetermined frequency.

FIG. 6A shows a flow diagram according to an embodiment of the present invention for calibrating one or more parameters of the algorithm that generates the compensation values based on the speaker driver signal 26. The speaker driver signal 26 is generated as a predetermined signal (step 82), such as a sinusoidal signal having a predetermined frequency. A parameter of the compensation algorithm is calibrated in response to the speaker driver signal 26 (step 84), such as calibrating a feed-forward generator in response to the error signal (e.g., PES) induced by the predetermined signal. The speaker driver signal 26 may comprise any predetermined signal having any desirable spectral components, including an impulse signal that may be used to measure the frequency response of the system.

Figure 6B:
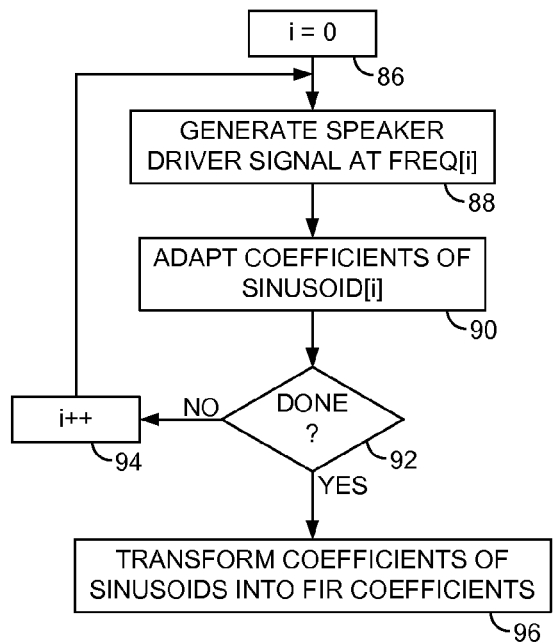
FIG. 6B is a flow diagram according to an embodiment of the present invention wherein the compensation values are adapted by computing coefficients of a sinusoid for a plurality of predetermined frequencies of the speaker driver signal.

FIG. 6B is a flow diagram according to another embodiment of the present invention for calibrating the compensation values based on the speaker driver signal 26. An index i is initialized to zero (step 86), and the speaker driver signal 26 is generated as a sinusoidal signal at the index frequency (step 88). Coefficients of a compensation sinusoid are then adapted (step 90) so as to drive the error signal (e.g., PES) toward zero. The flow diagram is then repeated (step 92) starting with step 88 (after incrementing the index i (step 94)) so as to generate a set of coefficients of compensation sinusoids corresponding to the different frequencies of the speaker driver signal 26. The set of coefficients are then transformed into a suitable form for generating the compensation values during normal operation, such as transforming the set of coefficients into coefficients of an FIR filter (step 96).

Any suitable control circuitry may be employed to implement the flow diagrams in the embodiments of the present invention, such as any suitable integrated circuit or circuits. For example, the control circuitry may be implemented within a read/write channel integrated circuit, or in a component separate from the read/write channel, such as a disk controller, or certain steps described above may be performed by a read/write channel and others by a disk controller. In one embodiment, the read/write channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read/write channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk;
a head;
an actuator for actuating the head over the disk; and
control circuitry comprising a servo control system for controlling the actuator, the control circuitry operable to:
generate a compensation value based on a speaker driver signal; and
control the actuator using the compensation value.

2. The disk drive as recited in claim 1, wherein the actuator is operable to actuate the head radially over the disk.

3. The disk drive as recited in claim 1, further comprising an interface operable to receive the speaker driver signal from a host.

4. The disk drive as recited in claim 3, wherein the speaker driver signal comprises an analog signal.

5. The disk drive as recited in claim 4, wherein the control circuitry is further operable to:
sample the analog signal to generate a digital signal; and
generate the compensation value in response to the digital signal.

6. The disk drive as recited in claim 3, wherein the speaker driver signal comprises a digital signal.

7. The disk drive as recited in claim 6, wherein the host converts the digital signal into an analog signal for driving a speaker.

8. The disk drive as recited in claim 1, wherein the compensation value comprises a feed-forward compensation value.

9. The disk drive as recited in claim 8, wherein the control circuitry further comprises a feed-forward generator operable to generate the feed-forward compensation value, the control circuitry further operable to:
generate a position error signal (PES) representing a difference between a measured position of the head and a reference position; and
adapt the feed-forward generator based on the speaker driver signal and the PES.

10. The disk drive as recited in claim 9, wherein the control circuitry is further operable to adapt the feed-forward generator during a calibration procedure when the speaker driver signal comprises a predetermined signal.

11. A method of operating a disk drive comprising a disk, a head, and an actuator for actuating the head over the disk, the method comprising:
generating a compensation value based on a speaker driver signal; and
controlling the actuator using the compensation value.

12. The method as recited in claim 11, wherein the actuator is operable to actuate the head radially over the disk.

13. The method as recited in claim 12, further comprising receiving the speaker driver signal from a host.

14. The method as recited in claim 13, wherein the speaker driver signal comprises an analog signal.

15. The method as recited in claim 14, further comprising:
sampling the analog signal to generate a digital signal; and
generating the compensation value in response to the digital signal.

16. The method as recited in claim 13, wherein the speaker driver signal comprises a digital signal.

17. The method as recited in claim 16, wherein the host converts the digital signal into an analog signal for driving a speaker.

18. The method as recited in claim 11, wherein the compensation value comprises a feed-forward compensation value.

19. The method as recited in claim 18, further comprising:
generating a position error signal (PES) representing a difference between a measured position of the head and a reference position; and
adapting a feed-forward generator based on the speaker driver signal and the PES.

20. The method as recited in claim 19, further comprising adapting the feed-forward generator during a calibration procedure when the speaker driver signal comprises a predetermined signal.

* * * * *